US010579873B2

(12) United States Patent
Lipsey et al.

(10) Patent No.: US 10,579,873 B2
(45) Date of Patent: Mar. 3, 2020

(54) AUTOMATED TOOL DATA GENERATION IN AUTOMATED ASSET MANAGEMENT SYSTEMS

(71) Applicant: SNAP-ON INCORPORATED, Kenosha, WI (US)

(72) Inventors: Matthew J. Lipsey, Sherwood, AR (US); David C. Fly, Maumelle, AR (US); Preston C. Phillips, Conway, AR (US); Jason Newport, Conway, AR (US); Andrew R. Lobo, Wadsworth, IL (US); Joseph Chwan, Mechanicsburg, PA (US); Frederick J. Rogers, North Little Rock, AR (US); Sean W. Ryan, Pleasant Prairie, WI (US); Thomas L. Kassouf, Port Washington, WI (US)

(73) Assignee: SNAP-ON INCORPORATED, Kenosha, WI (US)

( * ) Notice: Subject to any disclaimer, the term of this patent is extended or adjusted under 35 U.S.C. 154(b) by 124 days.

(21) Appl. No.: 15/895,485

(22) Filed: Feb. 13, 2018

(65) Prior Publication Data

US 2018/0232577 A1 Aug. 16, 2018

Related U.S. Application Data

(60) Provisional application No. 62/458,191, filed on Feb. 13, 2017.

(51) Int. Cl.
*G06K 9/00* (2006.01)
*G06K 7/10* (2006.01)
(Continued)

(52) U.S. Cl.
CPC ......... *G06K 9/00624* (2013.01); *B25H 3/028* (2013.01); *G06F 16/583* (2019.01);
(Continued)

(58) Field of Classification Search
CPC .... G06K 9/00624; G06K 9/6202; G06K 9/00; G06K 9/46; G06K 9/00771;
(Continued)

(56) References Cited

U.S. PATENT DOCUMENTS 6,840,451 B2 * 1/2005 Allen ..................... G06Q 10/06
235/462.09
6,989,749 B2 * 1/2006 Mohr ................... G06Q 10/087
235/385

(Continued)

FOREIGN PATENT DOCUMENTS

WO 2006/065563 A2 6/2006

OTHER PUBLICATIONS

Anonymous. "Wikipedia—Barcode", Feb. 6, 2017, pp. 1-26, https://en.wikipedia.org/w/index.php?title=Barcode (retrieved May 18, 2018).
(Continued)

*Primary Examiner* — Jose L Couso
(74) *Attorney, Agent, or Firm* — McDermott Will & Emery LLP

(57) ABSTRACT

An asset management system automatically generates and updates tool data stored in and used by the system for determining the presence or absence of tools or other inventory objects in the systems. The tool data can be automatically generated when a tool is newly added to the automated asset management system, and can be updated if and when characteristics of the tool and/or automated asset management system change. The automatic generation and updating includes automatically recognizing unique identifiers of tags located on inventory objects, automatically identifying an inventory object to associate with each unique identifier, and automatically populating a database to store each unique identifier in association with stored data for the corresponding inventory object.

17 Claims, 9 Drawing Sheets

(51) Int. Cl.
*G06K 9/62* (2006.01)
*G06N 20/00* (2019.01)
*G06F 16/583* (2019.01)
*H04N 7/18* (2006.01)
*B25H 3/02* (2006.01)
*G06Q 10/08* (2012.01)

(52) U.S. Cl.
CPC ....... *G06K 7/10366* (2013.01); *G06K 9/6202* (2013.01); *G06N 20/00* (2019.01); *G06Q 10/087* (2013.01); *H04N 7/18* (2013.01); *H04N 7/188* (2013.01)

(58) Field of Classification Search
CPC ...... G06K 9/3233; G06K 9/34; G06K 9/4652; G06K 9/4671; G06K 9/52; G06K 9/6201; G06K 9/6212; G06K 9/6232; G06K 9/18; G06K 7/10366; G06K 7/10861; G06K 7/10297; G06K 7/1404–1495; G06K 19/06037; G06K 19/07728; G06K 19/04; G06K 19/07758; G06K 2009/4666; G06K 2009/6213; G06K 2209/19; H04N 7/18; H04N 7/188; H04N 7/181; H04N 7/183; H04N 5/23229; H04N 9/47; G06F 16/583; G06N 20/00; B25H 3/028; B25H 3/00; B25F 5/00; G06Q 10/087; G06Q 10/08; G06Q 10/06; G06Q 10/00; G06Q 10/0833; G06Q 10/0875; G06Q 20/203; G06T 7/0008; G06T 2207/10024; G06T 2207/30108; G06T 2207/10004; G06T 2207/20224; B66F 9/0755; B66F 9/24; G05D 1/0234; G05D 2201/0216; G01S 5/16; E21B 41/00; E21B 41/0021; G08B 13/14; G08B 13/1427; G08B 13/196; G08B 13/2402; G08B 13/2417; G08B 13/246; G08B 13/248; G08B 13/2462; G07F 11/36; G07F 11/62; G07F 11/64; G07F 9/026; A47F 3/02; A47F 5/0815; G07C 9/00912; G07C 9/00103; G07C 9/00166; G07C 9/00111; G07C 9/00896; B23B 2270/36; B25B 23/00; G07G 1/0054; F25D 2500/06; G25B 19/418; Y02P 90/02; Y02P 90/205; Y02P 90/86; Y10S 81/05; Y10S 707/99943; Y10S 707/99945; G16H 10/65; G16H 40/20

See application file for complete search history.

(56) References Cited

U.S. PATENT DOCUMENTS

| | | | |
|---|---|---|---|
| 7,051,884 B2* | 5/2006 | Dick | A47F 5/0815 211/70.6 |
| 7,317,393 B2* | 1/2008 | Maloney | G07C 9/00103 340/568.1 |
| 7,336,174 B1* | 2/2008 | Maloney | G08B 13/1427 340/568.1 |
| 7,814,046 B2* | 10/2010 | Huang | G05B 19/418 707/601 |
| 8,010,483 B2* | 8/2011 | Huang | G05B 19/418 707/601 |
| 8,842,183 B2 | 9/2014 | Glickman et al. | |
| 9,041,508 B2 | 5/2015 | Glickman et al. | |
| 9,292,811 B2* | 3/2016 | O'Brien | G06Q 10/06 |
| 9,464,508 B2* | 10/2016 | Lerche | E21B 41/00 |
| 9,694,488 B2* | 7/2017 | Savage | B25H 3/00 |
| 9,740,790 B2* | 8/2017 | O'Brien | G06Q 10/06 |
| 9,741,014 B2 | 8/2017 | Rogers et al. | |
| 10,146,976 B2* | 12/2018 | O'Brien | G06F 16/9538 |
| 2006/0179473 A1* | 8/2006 | Innami | B25F 5/00 726/2 |
| 2008/0082579 A1* | 4/2008 | Huang | G05B 19/418 |
| 2009/0071854 A1* | 3/2009 | Martin | B25H 3/02 206/373 |
| 2009/0072029 A1* | 3/2009 | Martin | G06Q 10/087 235/385 |
| 2011/0025503 A1* | 2/2011 | Weaver | G08B 21/24 340/572.1 |
| 2013/0250117 A1* | 9/2013 | Pixley | H04N 7/181 348/156 |
| 2014/0252091 A1* | 9/2014 | Morse | F25D 29/00 235/385 |
| 2015/0287305 A1* | 10/2015 | Iyer | G06K 7/10366 340/572.1 |
| 2016/0045276 A1* | 2/2016 | Pfanner | G06K 7/1443 235/385 |
| 2016/0307150 A1 | 10/2016 | Rogers et al. | |

OTHER PUBLICATIONS

International Search Report and Written Opinion issued in International Application No. PCT/US2018/017793 dated Jun. 8, 2018.

* cited by examiner

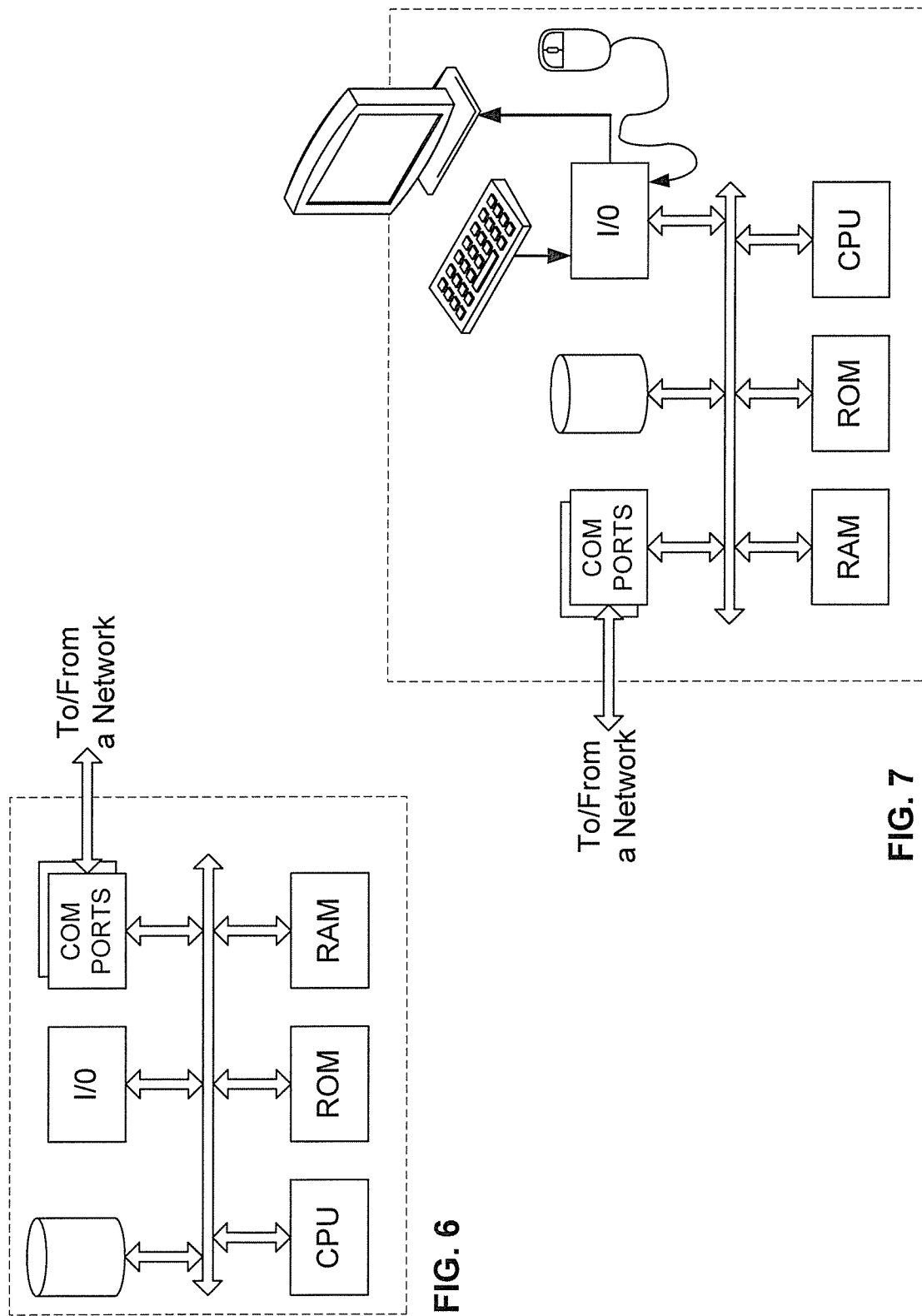

AUTOMATED TOOL DATA GENERATION IN AUTOMATED ASSET MANAGEMENT SYSTEMS

CROSS-REFERENCE TO RELATED APPLICATION

This application claims the benefit of U.S. Provisional Application No. 62/458,191, filed on Feb. 13, 2017, in the U.S. Patent and Trademark Office, the disclosure of which is incorporated by reference herein in its entirety.

TECHNICAL FIELD

The present subject matter relates to automated tool control systems, and to techniques and equipment to automatically generate and update a database of tool data for use in tracking tools stored in automated tool control systems.

BACKGROUND

When tools are used in a manufacturing or service environment, it is important that the tools be returned to a storage unit, such as a tool box, tool locker, or secure enclosed area (e.g., tool crib, tool room, tool closet, or walk in tool locker) after use. Some industries have high standards for inventory control of tools, for example to prevent incidents of leaving tools in the workplace environment where they could cause severe damages. In the aerospace industry, for instance, it is important to ensure that no tools are accidentally left behind in an aircraft or missile being manufactured, assembled, or repaired in order to prevent foreign object damage (FOD) to the aircraft.

Some toolboxes include built-in inventory determination features to track inventory conditions of tools stored in those toolboxes. For example, some toolboxes dispose contact sensors, magnetic sensors, or infrared sensors in or next to all tool storage locations to detect whether a tool is placed in each tool storage location. Based on signals generated by the sensors, the toolboxes are able to determine whether any tools are missing.

In toolboxes having built-in inventory determination features, the inventory conditions of tools are determined based on information received from sensors as well stored tool data. For example, an inventory condition of a particular tool can be determined by determining whether the information received from the sensors matches the stored tool data.

In order to provide accurate and up-to-date inventory information, the tool data needs to be generated and updated as tools, sensors, and the tools' sensed characteristics change. A need therefore exists for automated tool data generation and updating in asset management systems to provide accurate and up-to-date inventory information.

SUMMARY

The teachings herein alleviate one or more of the above noted problems by providing systems and method for automatically recognizing and storing in a database unique identifier encoded on tags of inventory objects for use in inventory control.

In accordance with one aspect of the disclosure, an automated asset management system includes a plurality of storage locations for storing objects, an image-based sensing system configured to generate images used to determine presence or absence of objects configured to be stored in the plurality of storage locations, a database storing data relating to the objects configured to be stored in the plurality of storage locations, a processor, and a non-transitory machine readable recording medium storing program instructions. The database stores data sufficient to enable the asset management system to determine the presence or absence of the objects from the storage locations based on the images generated by the image-based sensing system. The stored program instructions, when executed by the processor, cause the processor to perform a tool training process for automatically storing in the database a unique identifier encoded on a tag of an object. In particular, the processor performs using the image-based sensing system a first scan of the storage locations while a particular storage location associated with a particular object subject to the tool training is empty, and stores an image attribute of the particular storage location while the particular storage location is empty. The processor further performs using the image-based sensing system a second scan of the storage locations while the particular storage location associated with the particular object subject to the tool training is occupied by the particular object, and stores an image attribute of the particular storage location while the particular object is present. The processor determines, based on an image captured during the second scan, whether a tag encoding a unique identifier is present on the particular object, and updates the database storing data relating to the objects configured to be stored in the plurality of storage locations of the asset management system to include, in association with stored data relating to the particular object, the unique identifier of the tag determined to be present on the particular object.

In accordance with another aspect of the disclosure, a method is provided for automatically storing, in a database of an automated asset management system having a plurality of storage locations for storing objects, a unique identifier encoded on a tag of an object. The method includes performing, using an image-based sensing system configured to generate images used to determine presence or absence of objects configured to be stored in the plurality of storage locations of the asset management system, a first scan of the plurality of storage locations while a particular storage location associated with a particular object subject to tool training is empty. An image attribute of the particular storage location while the particular storage location is empty is stored in the database. The method performs, using the image-based sensing system, a second scan of the storage locations while the particular storage location associated with the particular object subject to the tool training is occupied by the particular object. An image attribute of the particular storage location while the particular object is present is stored in the database. The method determines, based on an image generated by the image-based sensing system during the second scan, whether a tag encoding a unique identifier is present on the particular object. The database of the asset management system storing data relating to the objects configured to be stored in the plurality of storage locations is updated to include, in association with stored data relating to the particular object, the unique identifier of the tag determined to be present on the particular object. The image attributes stored in the database are sufficient to enable the asset management system to determine the presence or absence of the objects from the storage locations based on the images generated by the image-based sensing system.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIGS. 6 and 7 are simplified functional block diagrams of computers that may be configured to function as tool storage systems or as a hosts or servers supporting functions of the tool storage system.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various methods and systems disclosed herein relate to the automated generation and updating of tool data stored in and used by automated asset management systems for determining the presence or absence of tools in such systems. The tool data may be generated when a tool is newly added to the automated asset management systems, and may be updated if and when characteristics of the tool and/or automated asset management system change.

In one example, an automated asset management system stores tool data for each of the tools whose inventory can be automatically monitored by the system. The tool data can include data on characteristics of tools to be stored in the system and/or data on characteristics of storage locations for tools in the system. When a new tool is to be stored in the system, or when a characteristic of a tool changes, a user can activate a tool training mode on the system. The tool training mode is used to generate and/or update the tool data stored by the automated asset management system based on characteristics of the tool sensed during a tool training procedure.

The tool training procedure can be used, for example, in situations in which tools have tags encoding unique identifiers affixed thereto. In such situations, the training procedure can be used following attachment of a tag to a tool to be stored in the automated asset system. By activating the tool training mode, the automated asset system is caused to conduct a silhouette training with no objects in the drawers, conduct a tool absence training to record color attributes of the empty storage locations, and to conduct tool presence training with the tool (and, optionally, a tag on the tool) in an associated storage location. The tool presence training can include scanning the storage locations multiple times (e.g., three times, or more) to record color, shape, and/or other attributes of the storage location with the tool present. If a tag is determined to be present on the tool during the tool presence training, the system recognizes the tag, validates the tag, and creates an association in a database of tool data associating the identified code provided on the tag with the tool's object data previously entered in the database. The tag data is initially stored in the automated asset system database and can then be copied to a server database.

Reference now is made in detail to the examples illustrated in the accompanying drawings and discussed below.

Figure 1A:
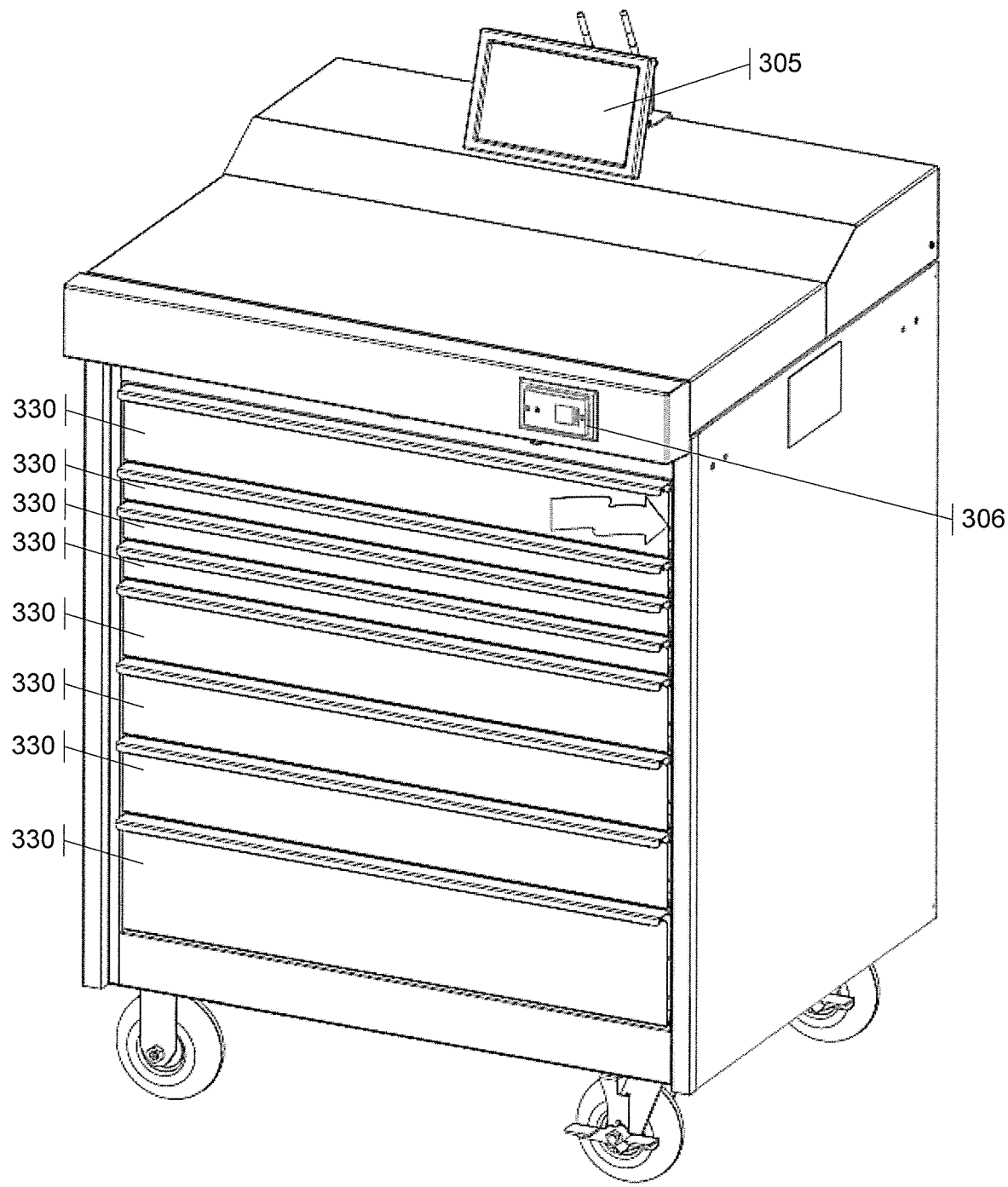
FIGS. 1A-1D show illustrative automated asset management systems in the form of tool storage systems that support functionality for automatically recognizing and storing tag data from inventory object.
Figure 1B:
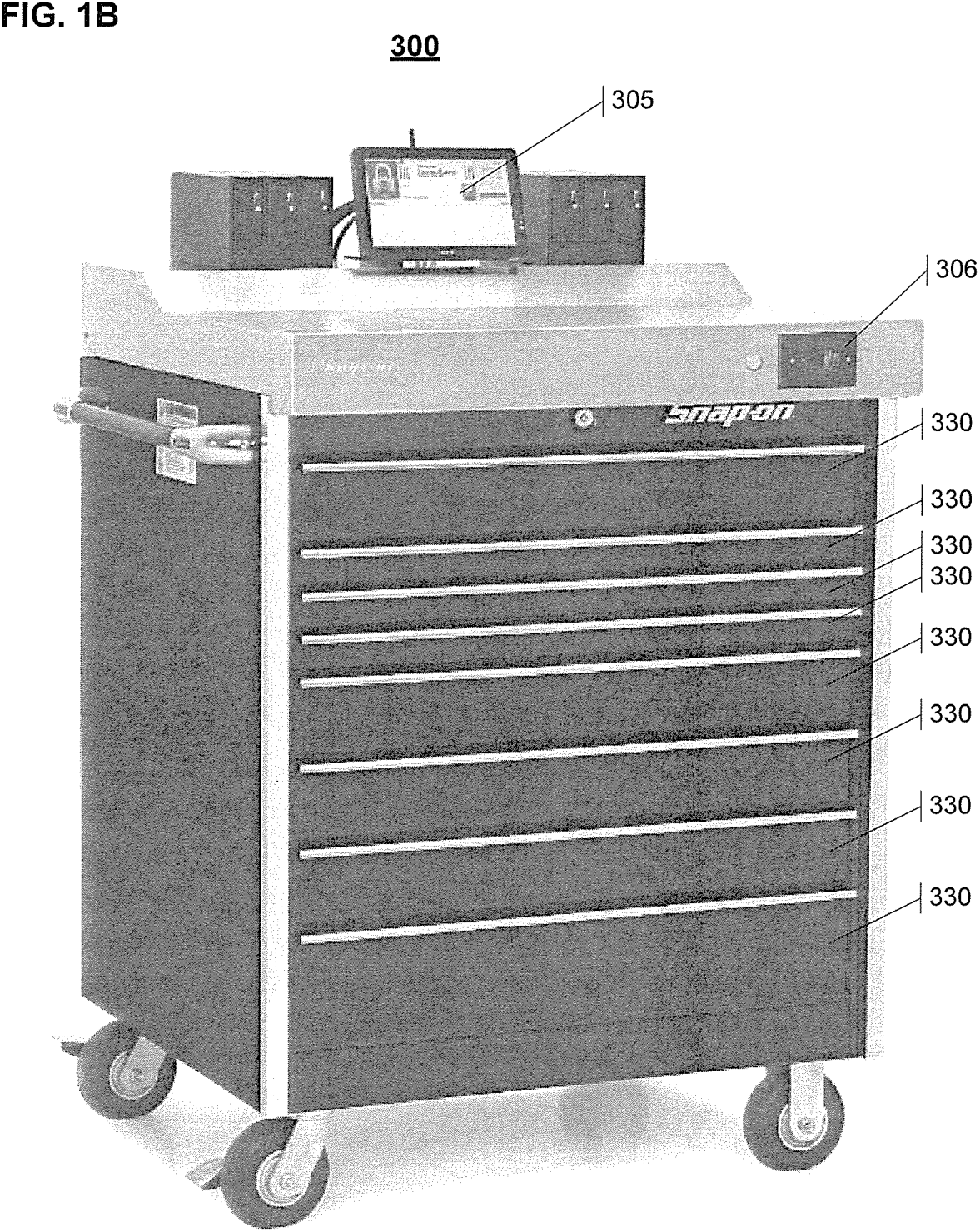
Figure 1C:
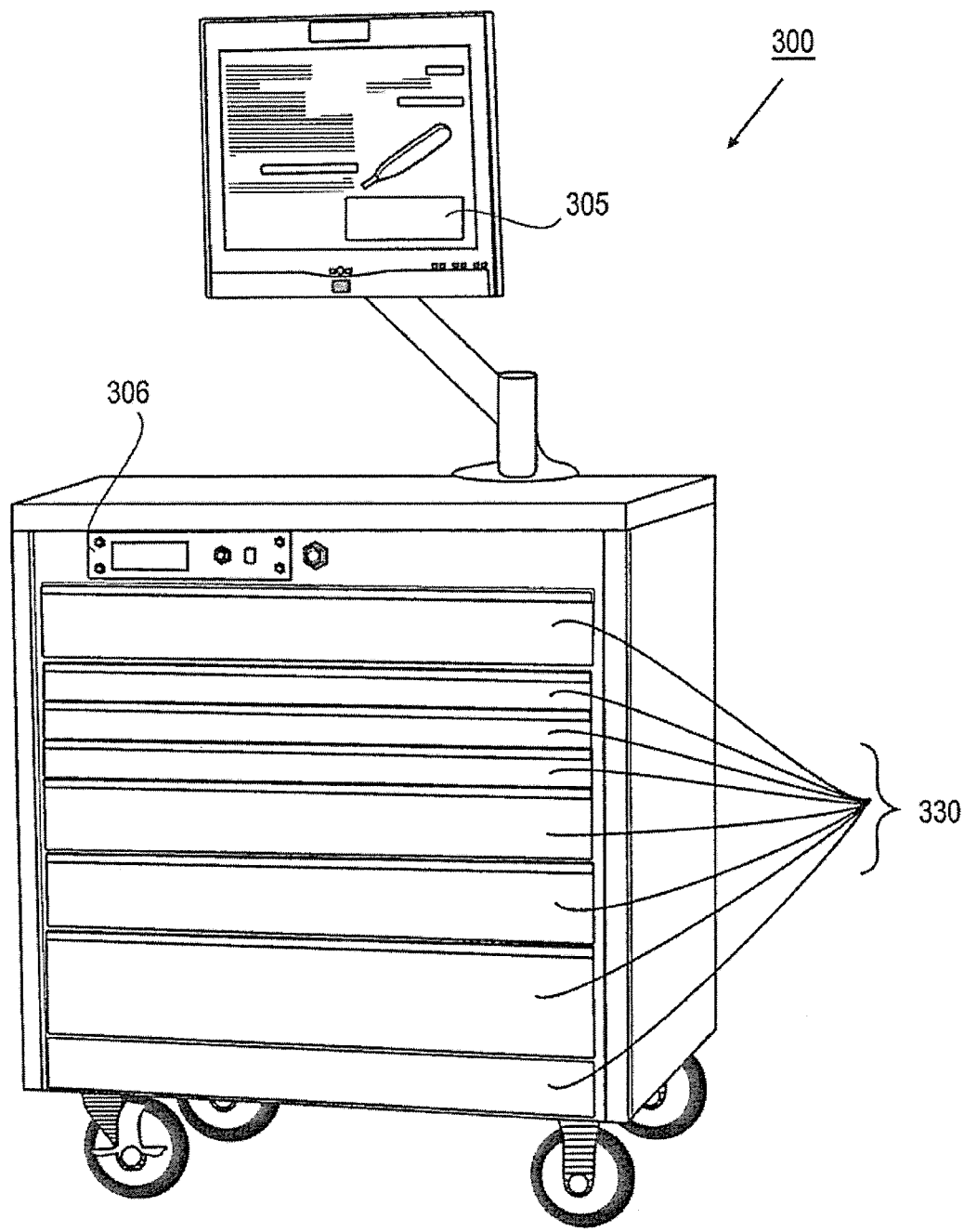
Figure 1D:
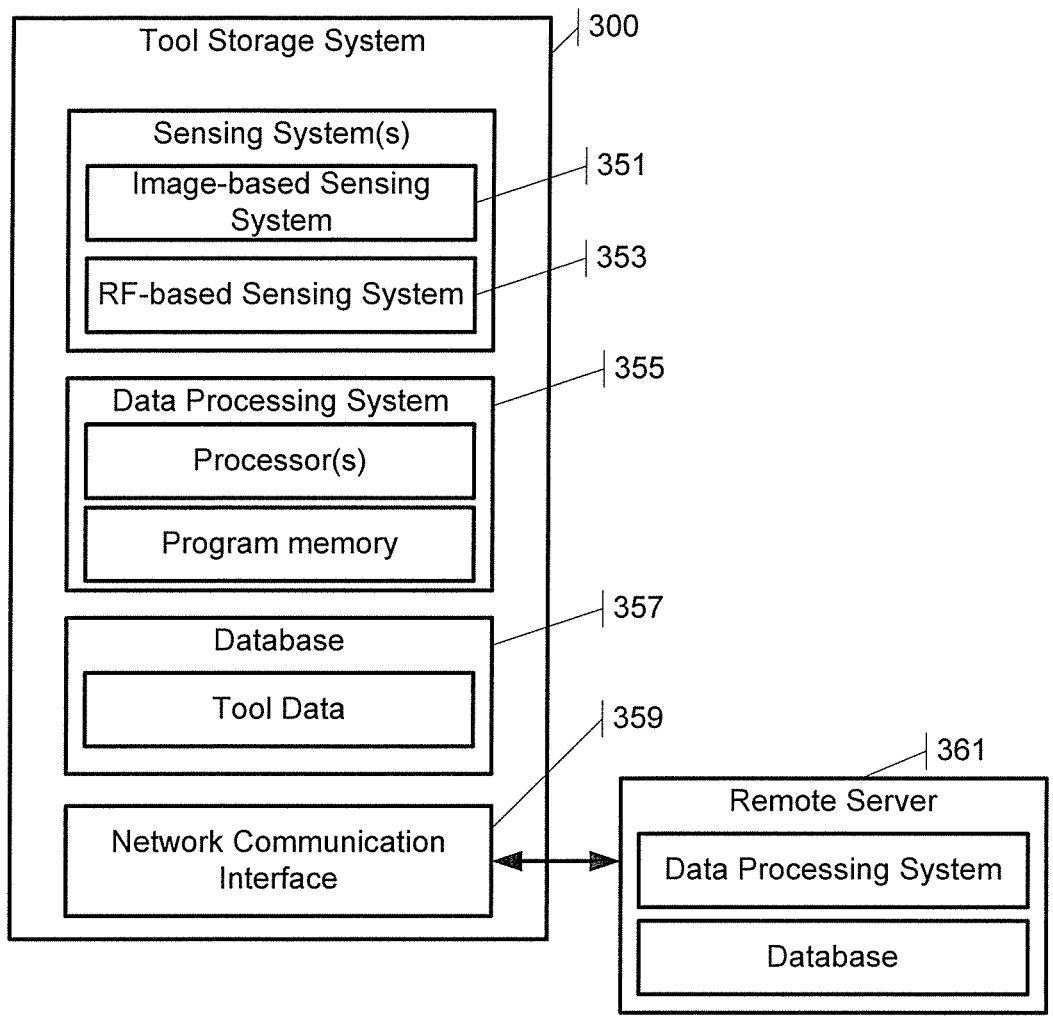

FIGS. 1A-1D show various illustrative automated asset management systems (or inventory control systems) in the form of tool storage systems 300. While the tool storage systems 300 shown in FIGS. 1A-1C are toolboxes, the tool storage systems 300 may more generally be tool lockers or any other secure storage devices or enclosed secure storage areas (e.g., a tool crib or walk-in tool locker).

Each tool storage system 300 is an example of a highly automated inventory control system that utilizes a single or multiple different sensing technologies for identifying inventory conditions of objects in the storage unit. In one example, the tool storage system 300 uses a machine imaging sensing methodology for identifying inventory conditions of objects in the storage unit. In another example, the system 300 uses a radio-frequency (RF) sensing technology for identifying the inventory conditions. In further examples, the system 300 uses both machine imaging sensing and RF sending technologies for identifying the inventory conditions.

More detailed information on the tool storage system 300 can be found in U.S. Pat. No. 9,041,508, entitled IMAGE-BASED INVENTORY CONTROL SYSTEM AND METHOD and issued on May 26, 2015, 2009; in U.S. Pat. No. 8,842,183, entitled IMAGE-BASED INVENTORY CONTROL SYSTEM WITH AUTOMATIC CALIBRATION AND IMAGE CORRECTION and issued Sep. 23, 2014; and in U.S. Pat. No. 9,741,014, entitled AUTOMATED ASSET MANAGEMENT SYSTEM WITH MULTIPLE SENSING TECHNOLOGIES and issued Aug. 22, 2017, which are hereby incorporated by reference in their entireties.

As shown in each of FIGS. 1A-1C, the tool storage system 300 includes a user interface 305, an access control device 306, such as a card reader, for verifying identity and authorization levels of a user intending to access storage system 300, and multiple tool storage drawers 330 for storing tools. Instead of drawers 330, the storage system may include shelves, compartments, containers, or other object storage devices from which tools or objects are issued and/or returned, or which contain the storage device from which the objects are issued and/or returned. In further examples, the storage system includes storage hooks, hangers, toolboxes with drawers, lockers, cabinets with shelves, safes, boxes, closets, vending machines, barrels, crates, and other material storage means.

User interface 305 is an input and/or output device of storage system 330 that is configured to receive and/or display information from/to a user. Access control device 306 is used to limit or allow access to tool storage drawers 330, based for example on authenticating a user's identity. Access control device 306, through the use of one or more electronically controlled locking devices or mechanisms, keeps some or all storage drawers 330 locked in a closed position until access control device 306 authenticates a user's authorization for accessing storage system 300. The access control device 306 further includes a processor and software to electronically identify a user requesting access to the secure area or object storage device. If access control device 306 determines that a user is authorized to access storage system 300, it unlocks some or all storage drawers 330, depending on the user's authorization level, allowing the user to remove or replace tools. In particular, the access control device 306 may identify predetermined authorized access levels to the system for different users, and allow or deny physical access by the user to the three dimensional space or object storage devices based on the predetermined authorized level of access for the identified user.

Tool storage system 300 can rely on various different sensing systems for operation. In an illustrative example shown in FIG. 1D, the tool storage system 300 includes an image-based sensing system 351 configured to capture images of contents or storage locations of the system. The image-based sensing system 351 may include lens-based cameras, CCD cameras, CMOS cameras, video cameras, or any type of device that captures images. The tool storage system 300 can alternatively or additionally include an RF-based sensing system 353 including one or more RFID antennas, RFID transceivers, and RFID processors, as further shown in FIG. 1D. The RF-based sensing system is configured to emit RF sensing signals, receive RFID signals returned from RFID tags mounted on or incorporated in tools or other inventory items in response to the RF sensing signals, and process the received RFID signals to identify individual tools or inventory items. Specifically, the received RFID signals may be processed to extract tag identification data included in the returned RFID signals, and to identify individual tools or inventory items based on an association between tag identification data and tool data stored by the system.

The image-based sensing system is described in further detail below in relation to FIG. 3. While FIG. 3 corresponds to the specific embodiment of the storage system 300 shown in FIGS. 1C and 1D, the teachings illustrated in FIG. 3 can be applied to each of the embodiments of FIGS. 1A-1C. The RFID sensing system may be configured to sense RFID tags of tools located in all storage drawers 330 of system 300, or configured to sense RFID tags of tools located in a particular subset of the drawers 330 of system 300. In one example, the RFID sensing system is configured to sense RFID tags of tools located only in the top-most and bottom-most drawers 330 of system 300, and the RFID sensing system includes RFID antennas disposed directly above the top-most and bottom-most drawers 330 within system 300 to sense RFID tags of tools located in those drawers. Other configurations of RFID antennas can also be used.

System 300 further includes a data processing system 355, such as a computer, for processing images captured by the image sensing device, for processing RF signals captured by the RFID antennas and transceivers, and/or for processing other sensing signals received by other sensing systems. The data processing system 355 includes one or more processors (e.g., micro-processors) and memory storing program instructions for causing the tool storage system 300 to communicate electronically directly or through a network with sensing devices and obtain data from sensing devices relative to the presence or absence status of objects within the three dimensional space or object storage device. Images, RFID signals, and other sensing signals captured or received by the sensing systems are processed by the data processing system 355 for determining an inventory condition of the system or each storage drawer. The term inventory condition as used throughout this disclosure means information relating to an existence/presence or non-existence/absence condition of objects in the storage system.

System 300 further includes a database 357 stored in non-transitory memory that is communicatively connected to the data processing system. In general, the database 357 is at least partially stored in memory local to the tool storage system 300 (e.g., operative memory of the tool storage system 300), although in some embodiments the database can be stored (or duplicated) on a server or other memory remote from the tool storage system 200. The database 357 stores tool data used by the data processing system 355 to determine the inventory conditions of tools or other objects stored in the tool storage system 300. The tool data can include data identifying each tool known to the tool storage system 300 including information such as a common tool name (e.g., "socket wrench) and/or a unique tool identifier (e.g., a serial number or other identifier). The tool data generally also includes information on storage location(s) for the tool in the tool storage system 300. The tool data further includes sensing data, such as data used to determine whether the tool is present in or absent from the tool storage system 300 based on the data received from sensors of the tool storage system 300. The sensing data can include an RFID identifier in cases in which an RFID sensing system is used, a numerical or barcode identifier in cases in which a barcode sensing system or other tag-based sensing system is used, image data or image-related data in cases in which an image-based sensing system is used, or the like. For example, in the case of image-based sensing systems, the sensing data can include image data (e.g., a stored image of the tool, of a storage location for the tool in which the tool is present, and/or of a storage location for the tool in which the tool is absent) or image-related data enabling the system to determine presence or absence of the tool (e.g., attributes of images in which the tool is or is not present on the basis of which the system can determine presence or absence of the tool). The stored tool data, in combination with sensing data received from the sensing subsystem, is generally sufficient to enable the system 300 to determine presence or absence of the tools for which data is stored.

The data processing system 355 may be part of tool storage system 300. Alternatively, the data processing system 355 can be implemented at least in part on a remote computer or server 361 having a data link, such as a wired or wireless link, coupled to tool storage system 300, or a combination of a computer integrated in storage system 300 and a computer remote from storage system 300. Additionally, the data processing system 355 can be connected to a computer network and exchange data with an administrative software application (e.g., as may be executed on a server) used to manipulate and store data and store and display information relative to the data to system users. For purposes of communicating with the remote computer or server 361, the tool storage system 300 generally includes a network communication interface 359 that can support wired or wireless communications with remote computers or servers through direct data links or communication networks.

Figure 2:
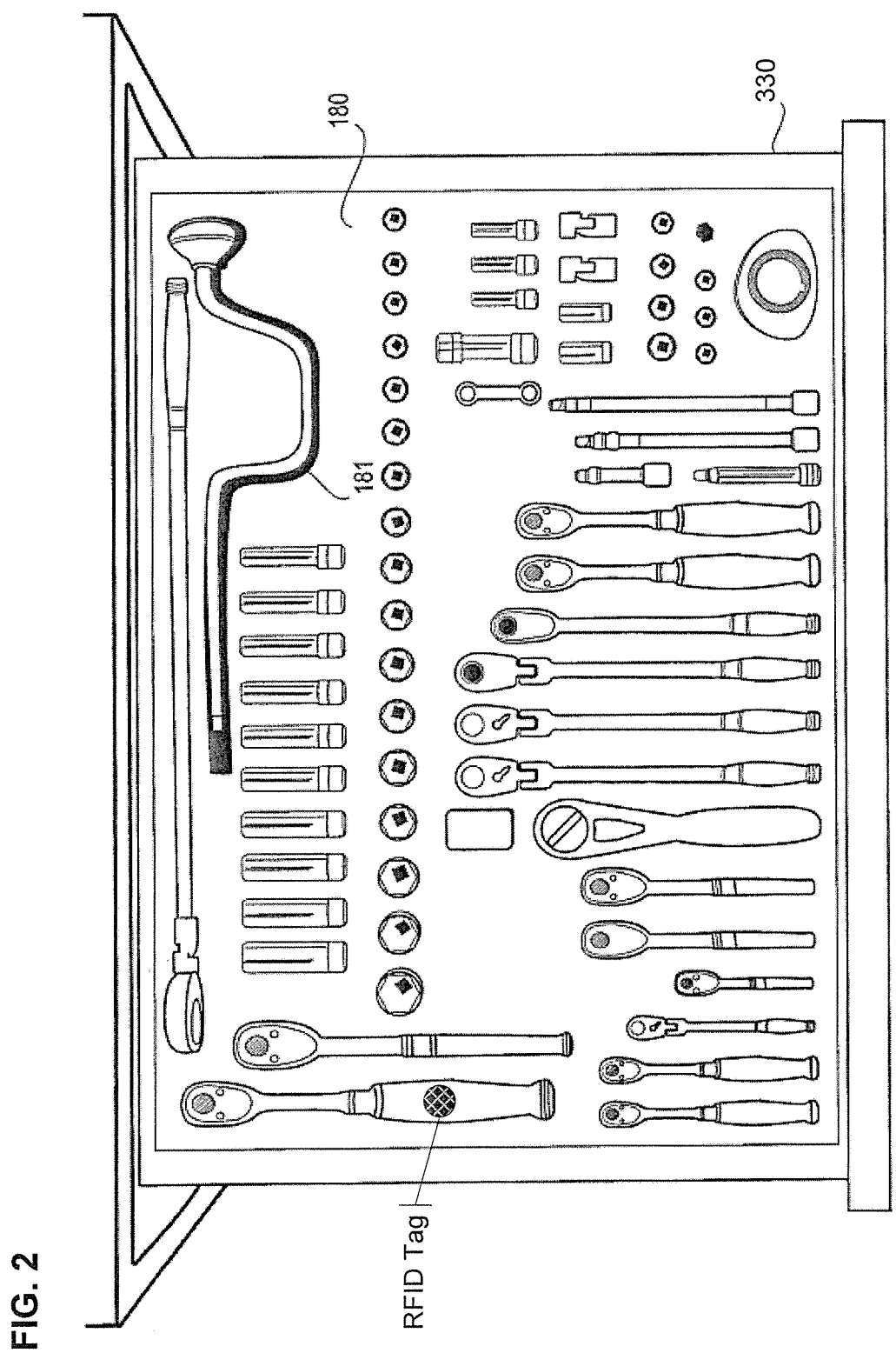
FIG. 2 shows a detailed view of one drawer of an automated tool storage system like those shown in FIGS. 1A-1C in an open position.

FIG. 2 shows a detailed view of one drawer 330 of the storage system 300 in an open position. Each storage drawer 300 includes a foam base 180 having a plurality of storage locations, such as tool cutouts 181, for storing tools. Each cutout is specifically contoured and shaped for fittingly receiving tools with corresponding shapes. Tools may be secured in each storage location by using hooks, Velcro, latches, pressure from the foam, etc. The foam base 180 can include additional holes or channels (not shown in FIG. 2) that are contiguous with the tool cutouts 181 and are designed to enable users' fingers to grasp objects or tools stored in the tool cutouts 181. In general, the additional holes or channels are positioned and shaped such that the tool cutouts 181 secure and immobilize the objects and tools in the storage system 300 despite the presence of the holes or channels.

In general, each storage drawer 330 includes multiple storage locations for storing various types of tools. As used throughout this disclosure, a storage location is a location in a storage system for storing or securing objects. In one embodiment, each tool has a specific pre-designated storage location in the tool storage system. In other embodiments, multiple tools can share one or more storage locations such that, for example, multiple identical wrenches can be stored in any of a set of storage locations that are configured (e.g., shaped) and pre-designated to store such identical wrenches. Further, one or more tools in the drawer 330 may have an RFID tag or other tag mounted or attached thereon.

Figure 3:
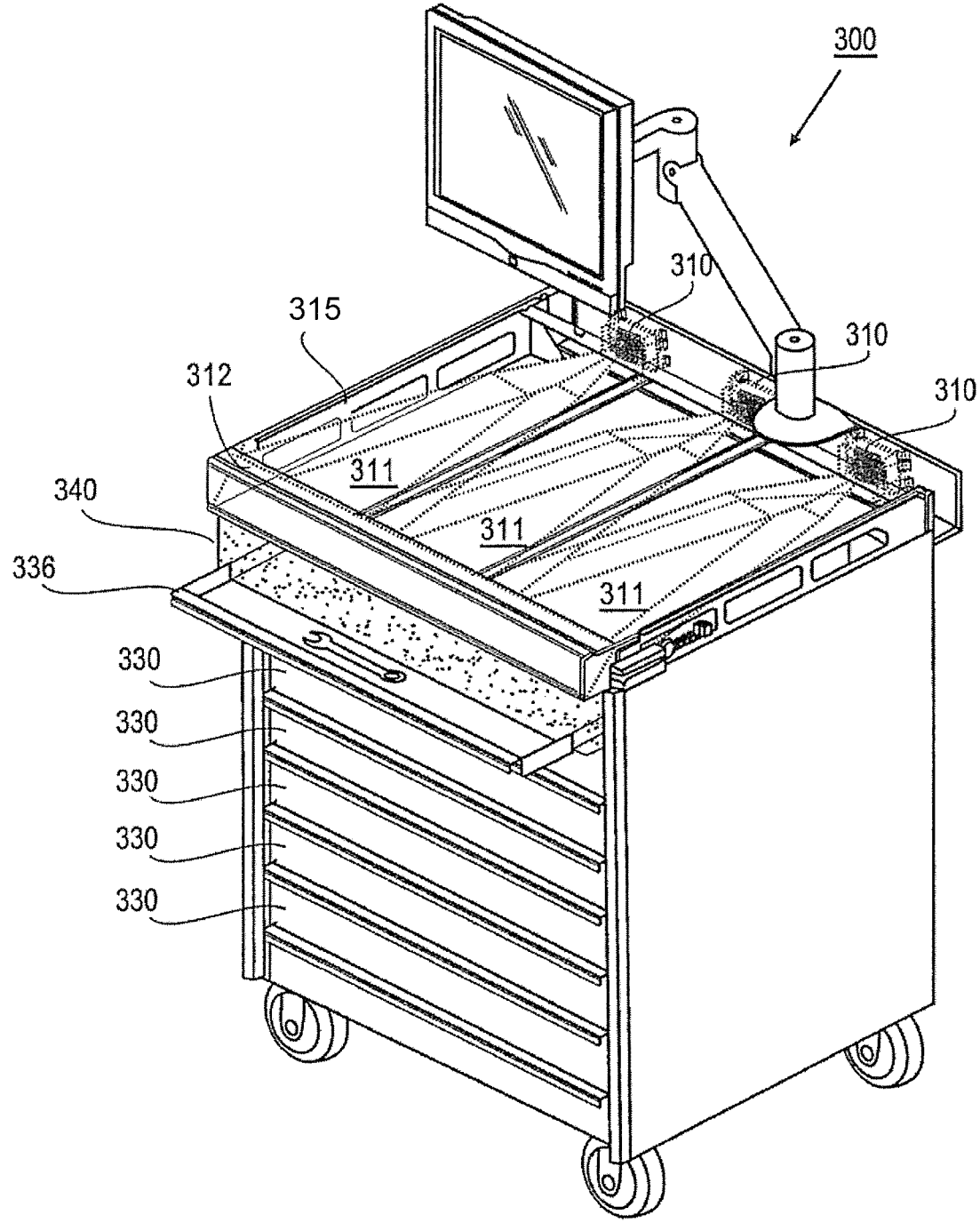
FIG. 3 shows a perspective view of an imaging system in an automated tool storage system like those shown in FIGS. 1A-1C.

FIG. 3 shows a perspective view of an imaging system in tool storage system 300. As illustrated in FIG. 3, storage system 300 includes an imaging compartment 315 which houses an image sensing system comprising three cameras 310 and a light directing device, such as a mirror 312 having a reflection surface disposed at about 45 degrees downwardly relative to a vertical surface, for directing light reflected from drawers 330 to cameras 310. The directed light, after arriving at cameras 310, allows cameras 310 to form images of drawers 330. The shaded area 340 below mirror 312 represents a viewing field of the imaging sensing system of tool storage system 300. As shown at 340, the imaging system scans a portion of an open drawer 336 that passes through the field of view of the imaging sensing system, for example as the drawer 336 is opened and/or closed. The imaging system thereby captures an image of at least that portion of the drawer 336 that was opened. Processing of the captured image is used to determine the inventory conditions of tools and/or storage locations in the portion of the drawer 336 that was opened.

In general, the image sensing system captures an image of a particular drawer 330 and performs an inventory of the drawer in response to detecting movement of the particular drawer. For example, the image sensing system may perform an inventory of the drawer in response to detecting that the drawer is closing or has become completely closed. In other examples, the image sensing system may image the drawer both as it is opening and as it is closing.

The RF sensing system is generally configured to perform inventory checks of drawers having RF-based tags associated therewith. The RF-based tags may be RFID tags that are attached to or embedded within the tools. In general, the RF-based tag encodes an identifier unique to the tool, such that both the tool type (e.g., screwdriver, torque wrench, or the like) and the unique tool (e.g., a particular torque wrench, from among a plurality of torque wrenches of the same model and type) can be identified from reading the RF-based tag. In particular, the information encoded in the RF-based tag is generally unique to the tool such that it can be used to distinguish between two tools that are of a same type, same model, same age, same physical appearance, etc.

The RF sensing system includes antennas mounted in or around the tool storage system 300. Each antenna is coupled to an RF transceiver that is operative to cause the antenna to emit an RF sensing signal used to excite the RF-based tags located within the vicinity of the antenna, and is operative to sense RF identification signals returned by the RF-based tags in response to the RF sensing signal. One or more RF processors control the operation of the RF transceivers and process the RF identification signals received through the antennas and transceivers.

In some instances, imaging-based inventory scans of the tool storage system 300 have the disadvantage that they cannot distinguish between physically identical (or similar) tools. For example, an imaging-based inventory scans may be unable to distinguish between two identical wrenches. In order to address this deficiency, the tool storage system 300 can rely on a tag-based system to distinguish between different tools. The tag-based system relies on a tag provided on a tool to uniquely identify the tool. Specifically, the tag can encode an identifier unique to the tool, such that the unique tool (e.g., a particular torque wrench, from among a plurality of torque wrenches of the same model and type) can be identified from reading the tag. In particular, the information encoded in the tag is generally unique to the tool such that it can be used to distinguish between two tools that are of a same type, same model, same age, same physical appearance, etc.

In one example, the tag-based system includes RFID tags placed on tools and encoding the identifiers unique to each tool.

Figure 4A:
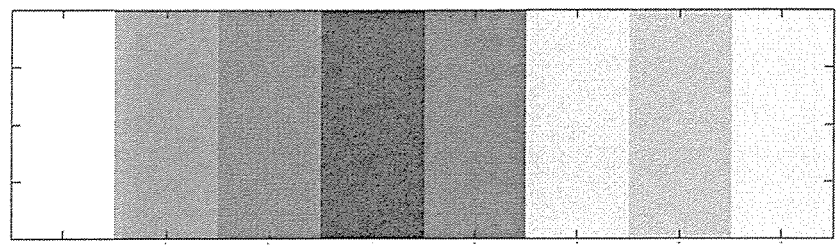
FIGS. 4A-4C show examples of tags that can be placed on tools or storage objects to encode unique identifiers and to be automatically recognized by an automated tool storage system like those shown in FIGS. 1A-1C.
Figure 4B:
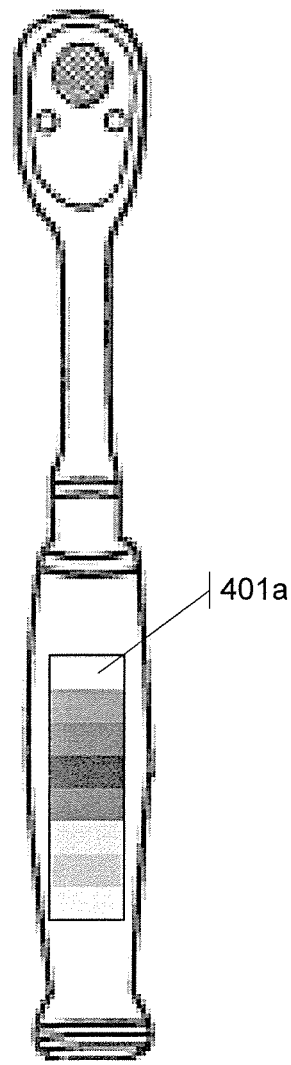
Figure 4C:
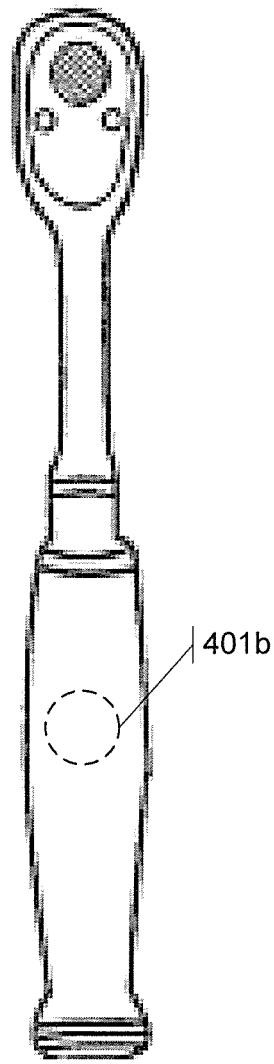

In another example, the tag-based system includes visible tags placed on tools and encoding the identifiers unique to each tool. The visible tags can be placed on the tools so as to be visible to the image sensing system of the tool storage system 300. Examples of tags are shown in FIGS. 4A-4C. For example, tags can include a tag 401a having a visible pattern thereon for recognition by an imaging-based sensing subsystem or a tag 401b disposed on or in a tool having an RFID-readable (or other wirelessly-readable) code encoded therein. Combination tags including both visible and RFID-readable codes may also be used.

While a single tag (401a, 401b) is shown as being placed on a tool in the illustrative examples of FIGS. 4B and 4C, multiple tags may be placed on a tool. For example, tags can be placed on multiple different faces of a tool to ensure that at least one tag is upward facing towards an imaging-based sensing subsystem (e.g., towards a camera 310) irrespective of the orientation in which the tool is placed in the tool storage system 300. The multiple tags located on a given tool may be identical to each other; alternatively, the multiple tags may be different from each other with tag data for each of the multiple tags being associated with the tool in the stored tool data used by the tool storage system 300.

The tags may be formed of a polycarbonate, polyester, or other suitable material, and may have an adhesive backing so as to adhere to the tools they are mounted on. In one example, the information encoded in the tags is encoded using differently colored bands or stripes such as those shown in the illustrative example of FIG. 4A (in which white, purple, red, black, dark blue, light blue, green, and yellow stripes are shown). Both primary colors and/or blended colors may be used. Each color stripe on the tag equates to a number (or alphanumeric character) and the combination of colors creates a code. In general, the first and last stripes represent start and stop codes. The start and stop codes can corresponds to particular respective colors. In one example, the start code can be a stripe of one particular color (e.g., cyan) and the stop code can be a stripe of another particular color (e.g., green), and all tags may start with the same start code and end with the same end code. In some examples, adjacent stripes are always of different colors (e.g., no color can be located directly adjacent to itself on a tag). In the embodiment depicted in FIG. 4A, all stripes have a same length and width; in order embodiments, adjacent stripes may have different lengths and/or widths.

For durability, the tags can include multiple layers including a first layer (base layer) formed of polycarbonate/polyester or other suitable material, a second layer including color coded ink, a third layer including white ink, a fourth layer including adhesive, and a fifth layer including a peel off backing that is removed when the tag is adhesively applied to a tool or other object.

In one example, the tag uses six different colors to establish the codes (e.g., six stripes of different colors in addition to the start code and stop code stripes). In this example, the total number of different codes that can be encoded on tags depends on the number of stripes provided on the tags. The tags may be designed with a restriction that no same color can be present in side to side adjacent stripes, for example to improve readability of the tags by the image sensing system. With such a restriction, 13,021 discrete tag codes can be formed using six digit codes (and six different colors) and 65,104 discrete tag codes can be formed using seven digit codes (and six different colors). Larger numbers of discrete tag codes can be obtained if the restriction is removed to allow same color stripes to be disposed adjacent to each other.

In other examples, different numbers of stripes/digits and/or different numbers of different colors can be used to generate larger or smaller numbers of discrete tag codes. For example, FIGS. 4A and 4B show illustrative examples in which eight stripes or bands are used (and in which eight different colors are used).

Additionally, tag sizes can vary depending on a distance of the tags from the imaging device and/or the sizes of tools. For example, large tags (with wide colored stripes/bands) can be provided for large tools and/or tools provided in lower drawers of a tool storage system 300 (e.g., drawers located relatively far from the imaging devices 310 in the example of FIG. 3), while smaller tags (with narrower colored stripes/bands) can be provided for smaller tools and tools provided in upper drawers (e.g., drawers located closer to the imaging devices 310).

In general, all of the stripes or bands on a tag have the same width as each other. The stripes or bands on different tags may have the same width as each other or, alternatively, stripes or bands on different tags may have different widths (e.g., as described above, larger tags may have wider stripes or bands, while smaller tags may have narrower stripes or bands).

In order for the tool storage system 300 to make use of the tags disposed on tools (and/or other objects) stored in the tool storage system 300, the tool data used by the tool storage system 300 to determine inventory conditions should include the tag data. In this regard, the tool data should be created or updated to include the unique identifier encoded in each tag and to associate the appropriate tool with each unique identifier.

In general, tool data stored by the tool storage system 300 is used to determine inventory conditions of objects/tools stored in the tool storage system 300. In an image-based tool storage system 300 that uses an image sensing system to determine the inventory condition (e.g., presence or absence) of objects and tools stored in the system 300, the tool data can be generated through the use of files such as text files. In operation, the database of tool data used by the system 300 is generated based on object related data that is entered into the system memory and database through the use of a process in which a data file (e.g., a text file) is created which defines specific object/tool attributes. The data file is read by a computer program during initial set up of the automated tool storage and control system 300 and data from the file is loaded into the appropriate fields of the tool data database to provide for proper operation of the system 300.

The data provided in the data file (e.g., text file) and loaded in the tool data database can include, for example, information associating with each entry in the data a customer (e.g., customer name or unique identifier), a storage device name (e.g., identifying a particular tool box or other storage device in which the tool or object is to be stored), a drawer identifier (e.g., identifying a particular drawer of the tool box or other storage device in which the tool or object is to be stored), a silhouette name, location, and shape identifier (e.g., a tool silhouette on the basis of which the system determines presence or absence of the tool from storage), an object description (e.g., a name for the tool), and information on channels and/or holes (e.g., channels and holes contiguous with object or tool storage locations and designed to enable users' fingers to grasp the objects or tools from the storage locations).

Typically, the information in the data files does not include information on the tags described above or on the unique identifiers encoded therein. The tag information may not be included in the data files because the tags (with their identifying codes/data) may only be applied to the stored objects/tools after the system database is populated with the information from the data files, and the identifying codes/data from the tags thus cannot generally be included in the data files read-in by the system. Moreover, the data file data may be provided by a manufacturer of the tool storage system 300 or a manufacturer of the tools, while the tags may be applied by an end user based on the particular tools to be used in the storage device, and the manufacturer may thus generally not know what identifying codes/data is to be associated with each object/tool in the data file.

As a result, the tag information generally needs to be provided to and loaded into the tool data database of the tool storage system 300 separately from the data files. The process for manually associating tag information with each set of tool data stored in the database is slow and tedious. As a result, an automated method to enter the identifying information from the tag into the tool data database of the tool control and storage system 300 and associate the tag information with pre-existing object/tool related data of the database is needed.

Moreover, if a tag must be replaced due to loss, damage, normal wear and tear, or other reason, an automated method to replace the existing tag identifying data stored in the tool data database with new data for the new replacement tag and to associate the new data with the appropriate object does not currently exist.

This disclosure thus provides an automated process to enter the identifying information from the tag into the tool data database of the tool control and storage system 300 and associate the tag information with pre-existing object related data. In addition, the disclosure also provides a quick and easy automated way to update the database and associate data from a new tag with the appropriate object stored in the tool control and storage system 300.

In operation, the automated process for updating the tool data database can be performed in a tool control and storage system 300 that includes electronic and software means to read and utilize text data contained in a data file (e.g., a text file) to populate the tool data database fields with tool data. The data can include, but is not limited to, an object identifier; a customer identifier or name; a storage device name; a drawer identifier; a silhouette name, location, and shape identifier; an object description; one or more channel definitions; one or more hole definitions; and/or other appropriate information.

The system also includes program instructions for causing the tool storage system 300 to operate in a tool/drawer training mode and cause the system 300 to read image data obtained by the image sensing system (e.g., at least one camera) and correlate the image data with the data from the data file (e.g., text file) that has been stored in the database.

The system then uses the correlated data to complete the steps in the tool training process for silhouette training, for absence signature acquisition, and/or for presence signature acquisition.

Figure 5:
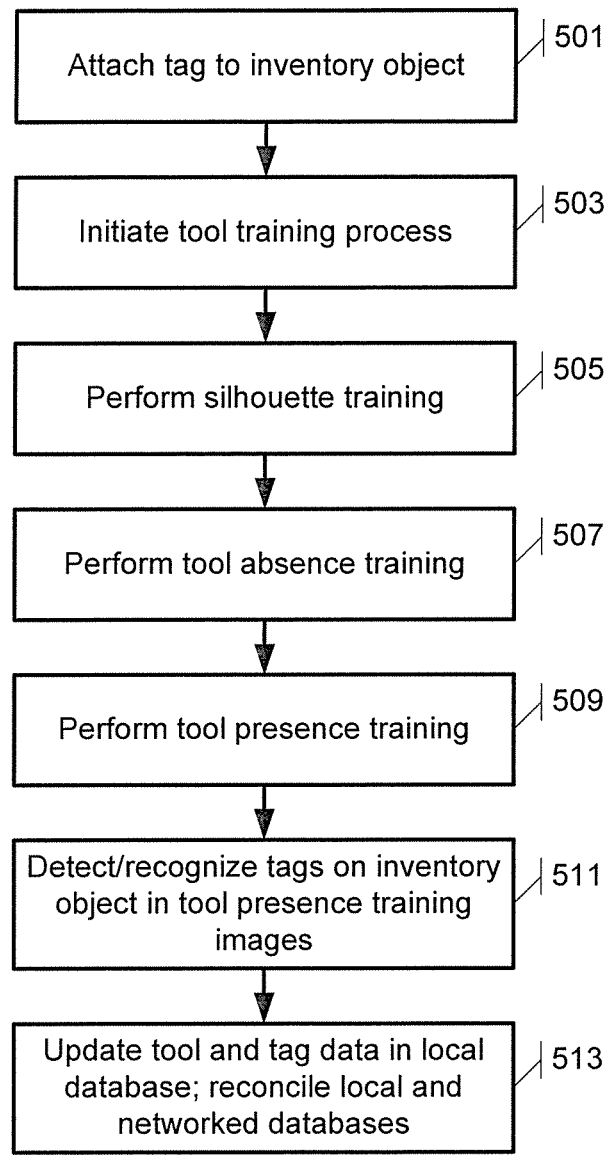
FIG. 5 is a simplified block diagram showing steps of a method for tool training including automatically recognizing and storing tag data from inventory object.

FIG. 5 is a simplified block diagram showing steps of a method 500 for tool training. In accordance with method 500, to automatically add tag information from tag to the tool data database of the system 300, steps may involve a step 501 for attaching a tag to an item (e.g., a tool or other objects) to be stored in a pocket or other storage location of the tool storage system 300. In turn, the tool training process in initiated in step 503. The tool training process can be initiated by a user by, for example, selecting a tool training process activation icon on a user interface 305 of the tool storage system 300. In one example, the user may select an option to initiate a tool training process for all tools/objects stored in a drawer, shelf, compartment, or tool storage system (e.g., by selecting the drawer, shelf, compartment, or the like on the user interface 305), or select an option to initiate a tool training process for one or more particular tools in the tool storage system (e.g., by selecting the one or more particular tools or objects on the user interface 305).

The tool training process conducts silhouette training with no objects in the tool storage locations in step 505. Prior to performing the silhouette training, the system 300 may thus instruct a user to remove from the storage locations those tools or other objects subject to training. The silhouette training can include the tool storage system 300 activating its image sensing system to scan all storage locations of the system and detect silhouettes of the storage locations when no objects are stored therein. In one example, the tool storage system 300 may instruct the user to open and close the drawer(s) subject to training in order to enable the image sensing system to capture image(s) of the storage locations. The tool storage system 300 can then perform imaging processing to identify silhouettes of tool storage locations in the captured images; for example, an edge detection algorithm may be used to detect edge of the tool storage locations in the image. In the case of a tool training process for all tools/objects, the tool storage system 300 then determines, based on pattern matching between the silhouettes of tool storage locations in the captured images and silhouettes of tool storage locations stored in memory of the tool storage system 300, an alignment between the silhouettes. In the case of a tool training process for one or more particular tools, the tool storage system 300 determines, based on an alignment between silhouettes of tool storage locations for the one or more particular tools in the captured image(s) and stored in memory, an alignment parameter between the tool storage locations and the image sensing system. The alignment parameter may characterize the positions of the storage locations within the storage drawers or shelves relative to the imaging sensing system, including characterizations of the positions and rotational alignment of the storage locations within the storage drawers or shelves and relative to the field of view of the imaging sensing system. The determined alignment parameter is then used by the tool training system 300 to identify the expected locations of storage locations and stored tools in images captured by the image sensing system in subsequent operation of the system 300.

The tool training process then conducts a tool absence training in step 507 to record color attributes (or other attributes) of the empty storage locations (or pockets). The tool absence training can include the tool storage system 300 activating its image sensing system to scan all storage locations of the system to detect color attributes of the storage locations when no objects are stored therein. Alternatively, the system 300 can use the image(s) captured during the silhouette training. In the tool absence training step, the tool storage system 300 identifies, for each storage location (e.g., each storage location identified through the silhouette training), the color, color signature, or other image attributes of the storage location when no tool or object is located in the storage location. In the case of a tool training process for all tools/objects, the tool absence training is performed for all storage locations; in the case of a tool training process for one or more particular tools, the tool absence training is performed for those storage locations associated with the one or more particular tools. The tool storage system 300 then stores the color, color signature, or other image attributes of the storage location when no tool or object is located in the storage location for use in future determinations of tool presence or absence.

In turn, the tool presence training process conducts tool presence training in step 509 with tool(s) in the storage locations (or pockets). As part of performing the presence training, the system 300 may instruct a user to place in the storage locations those tools or other objects subject to training. The tool presence training can include the tool storage system 300 activating its image sensing system to scan all storage locations of the system and detect image attributes of the storage locations when the objects/tools are stored therein. In one example, the tool storage system 300 may instruct the user to open and close the drawer(s) subject to training in order to enable the image sensing system to capture image(s) of the storage locations. The tool presence training can include performing three sequential scans to ensure accuracy and consistency of the data captured during each of the three scans. The system 300 may instruct the user to remove and replace the tools subject to training between the sequential scans and, if appropriate, to rotate the tools in the storage locations between the sequential scans (e.g., in situations in which tools can be inserted into the storage locations in more than one orientation). The tool presence training can result in the system recording image attributes or color attributes of storage locations (e.g., pockets) with tool(s) present. Specifically, in the tool presence training step, the tool storage system 300 identifies, for each storage location (e.g., each storage location identified through the silhouette training), the color, color signature, or other image attributes of the storage location(s) when the tool(s) or object(s) are present and located in the storage location(s). In the case of a tool training process for all tools/objects, the tool presence training is performed for all storage locations; in the case of a tool training process for one or more particular tools, the tool presence training is performed for those storage locations associated with the one or more particular tools. The tool training system 300 then stores the color, color signature, or other image attributes of the storage location when a tool or object is located in the storage location for use in future determinations of tool presence or absence.

If a tag (e.g., a tag including color-coded stripes or bands) is present on any tool or object during the tool presence training, the system 300 is operative to recognize the tag as a coded tag in step 511. In particular, the system may recognize the tag by identifying a tag start code and a tag stop code in an image captured by the image sensing system during the tool presence training, and by identifying an appropriate number of colored stripes (e.g., six stripes, or seven stripes) between the start code and stop code stripes. The system then detects and determines the tag code by identifying the color (or other attribute) of each strip and translating the sequence of identified colors into a sequence of corresponding alphanumeric characters, validates the tag code to ensure that the determined tag code confirms to an appropriate format, and creates an association in the tool data database associating the identified code data with the object data previously entered in the database through the use of the text file. The identified code data may be associated with the object data based on the location of the tag in the captured image; for example, the location of the tag may be compared with positions of identified silhouettes to identify a silhouette with which to associate the code data, and the code data may in turn be associated with the object data corresponding to the identified silhouette.

In examples in which the tool storage system 300 forms part of networked system, the tag data is initially stored in the tool data database stored locally by the system 300 and is later copied to a corresponding database stored in a connected server (step 513).

The foregoing description of the process for automatically adding tag information to the tag data database indicates that the silhouette training (step 505) and tool absence training (step 507) are performed when no objects are stored in storage locations of the tool storage system 300. More generally, however, the process can be performed to add tag information for a limited number of object(s) (e.g., one object, or two or more objects, but not necessarily all objects stored in the system 300). In such a case, the silhouette training (step 505) and tool absence training (step 507) are performed such that those storage locations associated with (or configured to store) the limited number of object(s) for which training is being performed are empty of storage objects. During the silhouette training (step 505) and tool absence training (step 507), the tool storage system 300 can identify which storage location(s) are empty (or otherwise do not have objects stored therein) based on the currently stored tool data of the database, and the system 300 can then perform the silhouette training (step 505) and tool absence training (step 507) on the identified storage location(s). In turn, the tool presence training (step 509) is then performed on the same set of identified storage location(s) such that tag data can be associated with each of the tools (and storage location(s)) in step 511.

The tool storage system 300 can similarly be used to update tag information stored in the database for example in cases in which replacement of a lost, worn, or damaged tag is performed. In such a situation, a user can remove the tag from the object if available and replace the tag with a new tag. In turn, the full tool training process as described above can be conducted.

Alternatively, the user can remove the tag from the object if available and replace the tag with the new tag. The user can then conduct an individual tool training process in which the user selects the tool for which training is to be performed (e.g., using a user interface of the tool storage system 300). Once the user has selected the tool, the system 300 conducts, silhouette training (e.g., 505) with no object in the storage location or pocket associated with the selected tool. The system 300 further conducts tool absence training (e.g., 507) to record color attributes of the empty storage location or pocket. In turn, the system 300 instructs the user to place the tool in the storage location and the system then conducts tool presence training (e.g., 509) with the selected tool in the storage location or pocket. The tool presence training can include scanning the storage location or pocket three times and recording color attributes of the storage location or pocket with the tool present. The silhouette, tool absence, and tool presence training steps can be performed irrespective of whether other storage locations or pockets (e.g., storage locations or pockets other than that of the selected tool) are occupied or unoccupied. The tool presence training further includes determining whether a color tag is present on any tool or object (e.g., 511) in images captured during the tool presence training and, if the determination indicates that a color tag is present, recognizing the color tag as a coded tag. The tag code is then determined and validated, and the system then associates in the tool data database the identified/validated code data with the object data previously entered in the database through the use of the text file.

As noted above, the tag data is initially stored in the database of the tool storage system 300 and is then copied to a server database in embodiments in which a server database is used (e.g., 513).

Since serialized tool data is now associated with the tool and can be identified through use of the tag, the tool with a tag applied can be stored in any identical pocket and the tool data will follow the tool.

In operation, the tool storage system 300 can use the stored tool data to determine presence or absence of tools or other objects in storage locations of the system. For example, the system 300 may capture an image of storage location(s) using the image sensing device and may compare the captured image (or a portion thereof determined to correspond to a storage location) to the stored image attributes stored during the tool absence training and tool presence training. Based on the comparison, the system 300 identifies the stored image that has the closest match to the captured image and determines presence or absence of the object or tool based on whether the closest match is to a stored image (or image attribute) associated with the presence or with the absence training. The system 300 further determines whether a color tag is present on any object or tool determined to be present based on the captured image, determines a tag code of the color tag, and thereby determines the identity of the particular object or tool present by retrieving object or tool data associated with the determined tag code.

FIGS. 6 and 7 provide functional block diagram illustrations of general purpose computer hardware platforms. FIG. 6 illustrates a network or host computer platform, as may typically be used to implement a server (e.g., 361). FIG. 7 depicts a computer with user interface elements, as may be used to implement a tool storage system 300 including a user interface 305, although the computer of FIG. 7 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. An automated asset management system comprising:
   a plurality of storage locations for storing objects;
   an image-based sensing system comprising at least a camera configured to generate images used to determine presence or absence of objects configured to be stored in the plurality of storage locations;
   a database storing data relating to the objects configured to be stored in the plurality of storage locations, wherein the database stores data sufficient to enable the asset management system to determine the presence or absence of the objects from the storage locations based on the images generated by the image-based sensing system;
   a processor; and
   a non-transitory machine readable recording medium storing program instructions which, when executed by the processor, cause the processor to perform a tool training process for automatically storing in the database a unique identifier encoded on a tag of an object by:
   performing using the image-based sensing system a first scan of the storage locations while a particular storage location associated with a particular object subject to the tool training is empty, and storing an image attribute of the particular storage location while the particular storage location is empty,
   performing using the image-based sensing system a second scan of the storage locations while the particular storage location associated with the particular object subject to the tool training is occupied by the particular object, and storing an image attribute of the particular storage location while the particular object is present,
   determining, based on an image captured during the second scan, whether a tag encoding a unique identifier is present on the particular object, and
   updating the database storing data relating to the objects configured to be stored in the plurality of storage locations of the asset management system to include, in association with stored data relating to the particular object, the unique identifier of the tag determined to be present on the particular object.

2. The automated asset management system of claim 1, wherein the processor determines presence of the tag encoding the unique identifier on the particular object by detecting a start code and a stop code in the image captured by the image-based sensing system during the second scan.

3. The automated asset management system of claim 1, wherein the processor determines presence of the tag encoding the unique identifier on the particular object system by detecting the tag in a portion of the image associated with the particular object.

4. The automated asset management system of claim 3, wherein the tag includes a plurality of adjacent stripes having different colors, and the processor is configured to determine the unique identifier encoded in the tag based on the sequence of colors in the adjacent stripes.

5. The automated asset management system of claim 1, wherein the processor determines presence of a tag encoding a unique identifier on the particular object by performing steps of:
   detecting the tag at a location associated with the particular object in the image captured by the image-based sensing system;
   identifying, in the detected tag, colors of adjacent stripes having different colors; and
   translating the identified colors into corresponding alphanumeric characters,
   wherein the updating of the database includes storing data including the translated alphanumeric characters corresponding to the identified colors of the tag.

6. The automated asset management system of claim 5, wherein the detecting of the tag comprises detecting, in the image captured by the image-based sensing system, a start code and a stop code associated with a tag, and identifying a portion of the image located between locations of the start code and the stop code as the detected tag.

7. The automated asset management system of claim 1, wherein the processor is further configured to determine the presence or absence of the particular object in the plurality of storage locations by performing steps of:
   performing a third scan of the storage locations using the image-based sensing system;
   determining the presence or absence of the particular object in at least one of the plurality of storage locations based on whether image attributes of an image captured in the third scan are a closest match to image attributes of images captured in the second or first scans, respectively.

8. The automated asset management system of claim 1, wherein the processor is further configured to:
   based on a first image generated by the image-based sensing system during the first scan, identify silhouettes of storage locations in the first image and determine an alignment between the identified silhouettes and expected locations of silhouettes stored in the automated asset management system,
   wherein the determined alignment is stored in the database storing data relating to the objects configured to be stored in the plurality of storage locations of the asset management system.

9. The automated asset management system of claim 1, wherein the processor provides an instruction to a user of the asset management system to ensure that the particular object is absent from the particular storage location of the asset management system prior to performing the first scan, and
   the processor provides an instruction to the user of the asset management system to place the particular object in the particular storage location of the asset management system prior to performing the second scan.

10. The automated asset management system of claim 1, wherein the processor determines, based on an image obtained in the first scan, a color characteristic of the determined storage location when no object is present therein, and
the processor determines, based on an image obtained in the second scan, an image attribute of the determined storage location when the object is present therein.

11. The automated asset management system of claim 1, wherein the processor provides an instruction to a user of the asset management system to affix a tag to the particular object prior to performing the second scan.

12. The automated asset management system of claim 1, wherein the processor updates the database storing data relating to the objects to replace a previously stored identifier associated with the particular object with the unique identifier of the tag determined to be present on the particular object.

13. The automated asset management system of claim 1, wherein the processor updates the database storing data relating to the objects by creating an entry associated with the data relating to the particular object determined to be present and including the unique identifier of the tag determined to be present on the particular object.

14. A method for automatically storing, in a database of an automated asset management system having a plurality of storage locations for storing objects, a unique identifier encoded on a tag of an object, the method comprising:
   performing, using an image-based sensing system comprising at least a camera configured to generate images used to determine presence or absence of objects configured to be stored in the plurality of storage locations of the asset management system, a first scan of the plurality of storage locations while a particular storage location associated with a particular object subject to tool training is empty;
   storing in the database an image attribute of the particular storage location while the particular storage location is empty;
   performing, using the image-based sensing system, a second scan of the storage locations while the particular storage location associated with the particular object subject to the tool training is occupied by the particular object;
   storing in the database an image attribute of the particular storage location while the particular object is present;
   determining, based on an image generated by the image-based sensing system during the second scan, whether a tag encoding a unique identifier is present on the particular object; and
   updating the database of the asset management system storing data relating to the objects configured to be stored in the plurality of storage locations to include, in association with stored data relating to the particular object, the unique identifier of the tag determined to be present on the particular object,
   wherein the image attributes stored in the database are sufficient to enable the asset management system to determine the presence or absence of the objects from the storage locations based on the images generated by the image-based sensing system.

15. The method of claim 14, wherein the determining whether a tag encoding a unique identifier is present on the particular object comprises identifying, in the image generated by the image-based sensing system during the second scan, a portion of the image that includes the particular object, and determining whether the tag is present in the identified portion of the image.

16. The method of claim 15, wherein the presence of the tag encoding the unique identifier on the particular object is determined by detecting a start code and a stop code in the identified portion of the image captured by the image-based sensing system during the second scan.

17. The method of claim 16, wherein the tag includes a plurality of adjacent stripes having different colors, and the method further comprises determining the unique identifier encoded in the tag based on the sequence of colors in the adjacent stripes.

* * * * *